United States Patent [19]

Tzikas

[11] Patent Number: 5,026,847
[45] Date of Patent: Jun. 25, 1991

[54] REACTIVE DYES, THEIR PREPARATION AND THEIR USE

[75] Inventor: Athanassios Tzikas, Pratteln, Switzerland

[73] Assignee: Ciba-Geigy Corporation, Ardsley, N.Y.

[21] Appl. No.: 422,862

[22] Filed: Oct. 17, 1989

[30] Foreign Application Priority Data

Oct. 20, 1988 [CH] Switzerland ............... 3913/88

[51] Int. Cl.⁵ .................................... C07D 498/00
[52] U.S. Cl. ............................. 544/76; 544/75
[58] Field of Search ............................ 544/75, 76

[56] References Cited

U.S. PATENT DOCUMENTS

| | | | |
|---|---|---|---|
| 4,577,015 | 3/1986 | Jäger et al. | 544/76 |
| 4,629,788 | 12/1986 | Jäger | 544/76 |

FOREIGN PATENT DOCUMENTS 210951 2/1987 European Pat. Off. .

OTHER PUBLICATIONS

Harms et al., Chemical Abstracts, vol. 104, p. 84, 111369n, 1986.
Springer et al., Chemical Abstracts, vol. 106, pp. 77, 197-834, 1987.

*Primary Examiner*—Jose G. Dees
*Assistant Examiner*—D. D. Carr
*Attorney, Agent, or Firm*—George R. Dohmann; Edward McC. Roberts

[57] ABSTRACT

Compounds of the formula

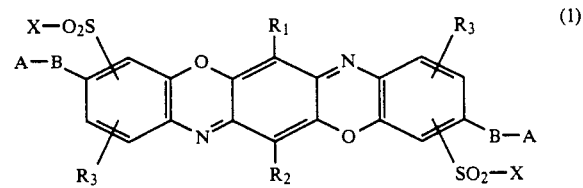

in which A, B, $R_1$, $R_2$, $R_3$ and X are as defined in claim 1 are suitable for use as dyes for dyeing and printing cellulose-containing fibre materials, and produce dyeings and prints having good fastness properties.

11 Claims, No Drawings

REACTIVE DYES, THEIR PREPARATION AND THEIR USE

Reactive dyes have for a long time been used on a large scale for dyeing and printing textiles composed of fibre materials, and there is now a large number of serviceable reactive dyes which have varying properties and are available for various fields of application. However, in view of the increasingly higher requirements for reactive dyeings, the technical state achieved is often not completely satisfactory in the light of cost-efficiency, application technique and level of fastness.

Thus, for example, it is frequently found that the degree of fixation is too low and the difference between the degree of exhaustion and the degree of fixation is too great (high saponification loss), so that a considerable part of the reactive dye is lost to the dyeing process. The build-up capacity also leaves something to be desired in many cases.

The present invention was based on the object of finding novel improved reactive dyes which have a high reactivity and a good build-up capacity, which can be used for dyeing with a high fixation yield, which, in particular, are suitable for the exhaustion dyeing process and which produce dyeings fast to wet processing and light on fibre material containing cellulose.

It has been found that the new reactive dyes defined later in the text meet these requirements.

The invention relates to compounds of the formula

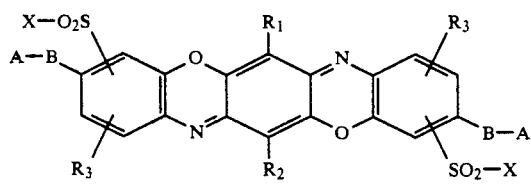

(1)

in which $R_1$, $R_2$ and $R_3$ independently of one another are hydrogen or a substituent, B is a direct bond or the radical —O—, X is hydroxyl and A is a radical of the formula

   (2a)

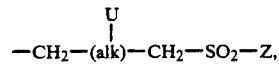   (2b)

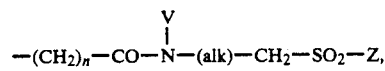   (2c)

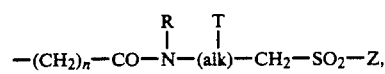   (2d)

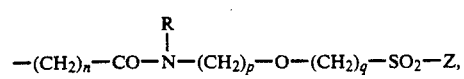   (2e)

   (2f)

   (2g)

-continued

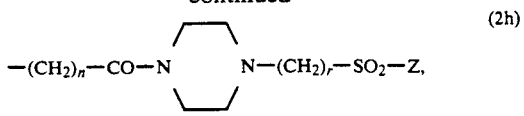   (2h)

in which U is hydroxyl, sulfato, sulfo or halogen, V is hydrogen, substituted or unsubstituted $C_1$-$C_4$alkyl or a radical —(alk)—$CH_2$—$SO_2$—Z, (alk) is a $C_1$-$C_6$alkylene radical, R is hydrogen or $C_1$-$C_6$alkyl, T is hydrogen, halogen, hydroxyl, sulfato, carboxyl, cyano, $C_1$-$C_4$alkanoyloxy, $C_1$-$C_4$alkoxycarbonyl or a radical —$SO_2$—Z, Z is a radical of the formula —CH=$CH_2$ or —$CH_2$—$CH_2$—Y, Y is a detachable group, m is an integer from 2 to 6 and n, p, q and r independently of one another are an integer from 1 to 6, or X is as defined above for Z and A is a radical of the formula

   (3a)

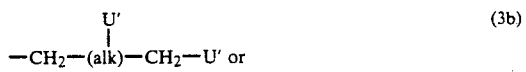   (3b)

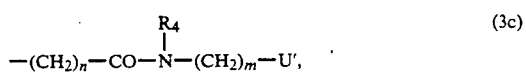   (3c)

in which $R_4$ is hydrogen, $C_1$-$C_4$alkyl or a radical —$(CH_2)_m$—U', U' is hydroxyl, sulfo or sulfato and (alk), n and m are in each case as defined above.

Examples of the radicals $R_1$ and $R_2$ are hydrogen, halogen, such as bromine and especially chlorine, $C_1$-$C_4$alkyl, which is to be generally understood as methyl, ethyl, n-propyl, isopropyl, n-butyl, sec-butyl or tert-butyl, $C_1$-$C_4$alkoxy, which is to be understood in general as methoxy, ethoxy, n-propoxy, isopropoxy, n-butoxy, isobutoxy or tert-butoxy, phenoxy, carboxyl, carbamoyl or $C_1$-$C_4$alkanoylamino, for example acetylamino. $R_1$ and $R_2$ are preferably each hydrogen, methyl, methoxy, acetylamino and, particularly preferably, chlorine.

The radical $R_3$ has, for example, the meaning hydrogen, $C_1$-$C_4$alkyl, $C_1$-$C_4$alkoxy, halogen, carboxyl, carbamoyl, N-$C_1$-$C_4$alkyl or N,N-di-$C_1$-$C_4$alkylcarbamoyl, $C_1$-$C_4$alkylsulfonyl, sulfamoyl, N-$C_1$-$C_4$alkyl or N,N-di-$C_1$-$C_4$alkylsulfamoyl.

$R_3$ is preferably hydrogen, chlorine, $C_1$-$C_4$alkyl or $C_1$-$C_4$alkoxy and, particularly preferably, hydrogen.

A preferred embodiment of the invention relates to compounds of the formula (1) in which $R_1$ and $R_2$ are each chlorine and $R_3$ is hydrogen.

B is preferably the radical —O—.

U in the formula (2a) is preferably sulfato.

As a substituted $C_1$-$C_4$alkyl radical, V can be, for example, a $C_1$-$C_4$alkyl radical which is substituted by halogen, hydroxyl, cyano, carboxyl, sulfo, sulfato, $C_1$-$C_4$alkoxy or $C_1$-$C_4$alkoxycarbonyl.

The following are examples of substituted $C_1$-$C_4$alkyl radicals: carboxymethyl, β-carboxyethyl, methoxycarbonylmethyl, ethoxycarbonylmethyl, β-methoxyethyl, β-ethoxyethyl, β-chloroethyl, γ-bromopropyl, β-hydroxyethyl, β-hydroxybutyl, β-cyanoethyl, sulfomethyl, β-sulfoethyl and β-sulfatoethyl.

As a radical of the formula Z—$O_2$S—$H_2$C—(alk)—, V can be different from the second radical Z—$O_2$S—$H_2$C—(alk)— present in the formula (2c) or, preferably, can be identical with the latter.

V is preferably hydrogen, methyl, ethyl or the group Z—O$_2$S—H$_2$C—(alk)—; V is particularly preferably hydrogen.

Examples of (alk) in the formulae (2b), (2c), (2d) and (3b) are a methylene, ethylene, 1,3-propylene, 1,4-butylene, 1,5-pentylene or 1,6-hexylene radical or branched isomers thereof. (alk) is preferably a C$_1$–C$_4$alkylene radical, particularly methylene or ethylene.

Examples of R as a C$_1$–C$_6$alkyl radical are a methyl, ethyl, n-propyl, isopropyl, n-butyl, sec-butyl or tert-butyl radical or a linear or branched pentyl or hexyl radical.

R is preferably hydrogen, methyl or ethyl, particularly preferably hydrogen.

T is preferably hydrogen, hydroxyl, sulfato, acetoxy, carboxyl, methoxycarbonyl, ethoxycarbonyl or the group —SO$_2$—Z; T is particularly preferably hydrogen or a radical —SO$_2$—Z.

The following are examples of suitable detachable groups Y: —OSO$_3$H, —SSO$_3$H, —OCOCH$_3$, —O-CO—C$_6$H$_5$, OPO$_3$H$_2$, —Cl, —Br, —F,

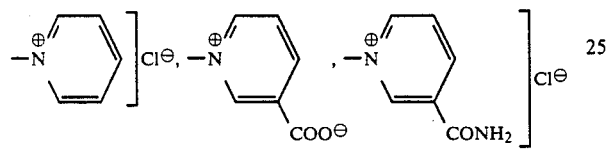

Y is preferably the group —OSO$_3$H, —SSO$_3$H, —O-COCH$_3$, —OPO$_3$H$_2$ or —Cl, particularly preferably the group —OSO$_3$H. m is preferably an integer from 2 to 5, particularly preferably the number 3, 4 or 5. n is preferably an integer from 1 to 4, particularly preferably the number 1 or 2. p and q independently of one another are preferably an integer from 1 to 4; p and q are particularly preferably the number 2 in each case. r is preferably an integer from 1 to 4, preferably the number 2 or 3.

If X is hydroxyl, the radical A preferably has the formula $$—(CH_2)_{2-5}—SO_2—Z', \quad (2a')$$

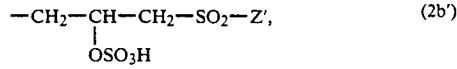

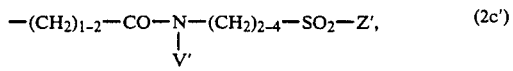

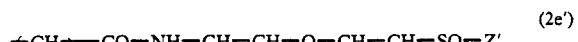

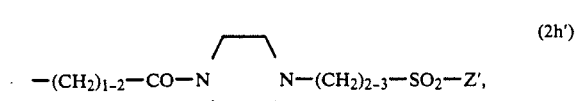

in which V' is hydrogen, methyl, ethyl or a radical $$—(CH_2)_{2-4}—SO_2—Z',$$

Z' is —CH=CH$_2$ or —C$_2$—Y' and Y' is —OSO$_3$H, —SSO$_3$H, —OCOCH$_3$, OPO$_3$H$_2$ or —Cl.

The following are examples of particularly preferred radicals A in this connection:
—(CH$_2$)$_2$—SO$_2$—(CH$_2$)$_2$—OSO$_3$H
—(CH$_2$)$_3$—SO$_2$—(CH$_2$)$_2$—OSO$_3$H
—(CH$_2$)$_4$—SO$_2$—(CH$_2$)$_2$—OSO$_3$H
—(CH$_2$)$_5$—SO$_2$—(CH$_2$)$_2$—OSO$_3$H
—CH$_2$—CO—NH—(CH$_2$)$_2$—SO$_2$—(CH$_2$)$_2$—OSO$_3$H
or

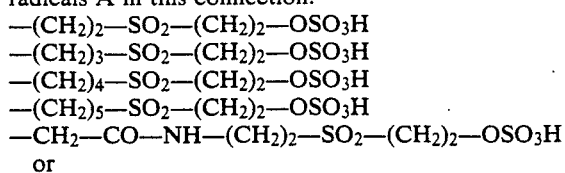

U' is preferably sulfato. R$_4$ is preferably hydrogen or a radical —(CH$_2$)$_m$—U' in which the meanings and preferences mentioned previously apply to U' and m.

If X is as defined previously for Z, A is preferably a radical of the formula $$—(CH_2)_{2-4}—OSO_3H, \quad (3a')$$

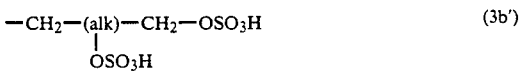

or

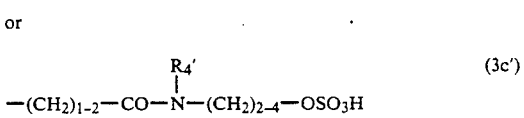

in which (alk) is methylene or ethylene and R$_4$' is hydrogen or a radical —(CH$_2$)$_{2-4}$—OSO$_3$H.

The following are examples of particularly preferred radicals A in this connection:
—CH$_2$—CH$_2$—OSO$_3$H

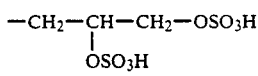

—CH$_2$—CO—NH—CH$_2$—CH$_2$—OSO$_3$H
—CH$_2$—CH$_2$—CO—NH—CH$_2$—CH$_2$—OSO$_3$H or
—CH$_2$—CO—N—(CH$_2$—CH$_2$—OSO$_3$H)$_2$.

A preferred group of dyes according to the invention embraces compounds of the formula (1) in which R$_1$ and R$_2$ are each chlorine and R$_3$ is hydrogen, X is hydroxyl, B is the radical —O— and A is a radical of the formula (2a'), (2b'), (2c'), (2e'), (2f') or (2h') indicated previously.

Compounds of the formula (1) which are particularly preferred in this connection are those in which R$_1$ and R$_2$ are each chlorine, R$_3$ is hydrogen, X is hydroxyl, B is —O— and A is a radical
—(CH$_2$)$_2$—SO$_2$—(CH$_2$)$_2$—OSO$_3$H,
—(CH$_2$)$_3$—SO$_2$—(CH$_2$)$_2$—OSO$_3$H,
—(CH$_2$)$_4$—SO$_2$—(CH$_2$)$_2$—OSO$_3$H,
—(CH$_2$)$_5$—SO$_2$—(CH$_2$)$_2$—OSO$_3$H,
—CH$_2$—CO—NH—(CH$_2$)$_2$—SO$_2$—(CH$_2$)$_2$—OSO$_3$H
or

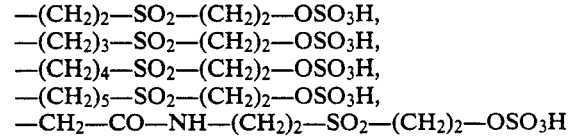

A further group of preferred dyes embraces compounds of the formula (1) in which R$_1$ and R$_2$ are each chlorine and R$_3$ is hydrogen, X is —CH=CH$_2$ or —CH$_2$—CH$_2$—Y' in which Y' is as defined previously, B is the radical —O— and A is a radical of the formula (3a'), (3b') or (3c') indicated previously.

Compounds of the formula (1) which are particularly preferred in this connection are those in which $R_1$ and $R_2$ are each chlorine, $R_3$ is hydrogen, X is —CH$_2$—CH$_2$—OSO$_3$H, B is —O— and A is a radical —CH$_2$—CH$_2$—OSO$_3$H,

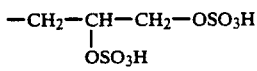

—CH$_2$—CO—NH—CH$_2$—CH$_2$—OSO$_3$H,
—CH$_2$—CH$_2$—CO—NH—CH$_2$—CH$_2$—OSO$_3$H or
—CH$_2$—CO—N (CH$_2$—CH$_2$—OSO$_3$H)$_2$.

The compounds of the formula (1) can be obtained in a manner known per se, for example by subjecting an amine of the formula

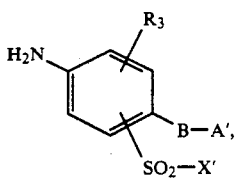 (4)

in which $R_3$ and B are as defined previously, A' is as defined for A previously or is a radical of the formula (2a) to (2h) indicated previously and in which Z is —CH$_2$—CH$_2$—OH, and X' is as defined previously for X or is the radical —CH$_2$—CH$_2$—OH, to a condensation reaction with a 1,4-benzoquinone of the formula

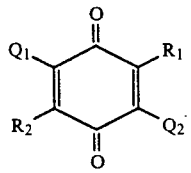 (5)

in which $R_1$ and $R_2$ are as defined previously and $Q_1$ and $Q_2$ are each hydrogen, chlorine, bromine, C$_1$–C$_4$alkoxy or phenoxy, to give a compound of the formula

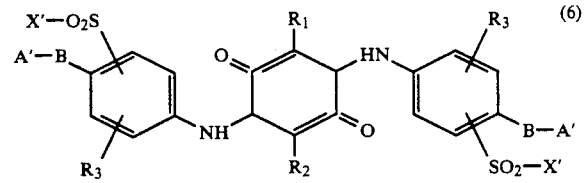 (6)

reacting the resulting anil compound by subsequent ring closure to give the dioxazine compound and, if appropriate, converting the radicals A' and/or X' into radicals A and/or X.

The condensation reaction between the amines of the formula (4) and the benzoquinones of the formula (5) is advantageously carried out in an aqueous or aqueous organic medium to which alkaline condensation agents are added at pH values from 3 to 11, preferably 4 to 8, and temperatures from 20° to 100° C., preferably 30° to 60° C., or in buffered solutions containing the above alkaline condensation products. It is also possible to carry out the reaction in a purely organic medium to which acid-binding agents are added.

Examples of alkaline condensation agents are sodium bicarbonate, sodium carbonate, sodium acetate, potassium acetate, sodium hydroxide, potassium hydroxide, sodium phosphates or sodium borate.

The compounds of the formula (4) are novel and constitute a further subject of the invention.

The compounds of the formula (4) in which X' is —OH, B is —O— and A' is a radical of the formula (2a) indicated previously, can be prepared in a manner known per se, for example by reacting a nitrophenol of the formula

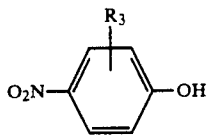 (8)

in which $R_3$ is as defined previously with a halogen compound of the formula

Hal—(CH$_2$)$_m$—OH (9)

in which Hal is halogen, especially chlorine, and m is as defined previously, to give the ether compound of the formula

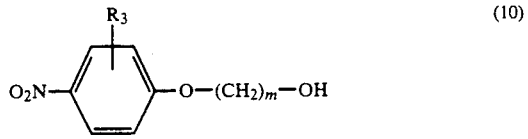 (10)

converting the latter by a suitable chlorination reaction, for example by means of thionyl chloride, into the corresponding chloroalkane compound of the formula

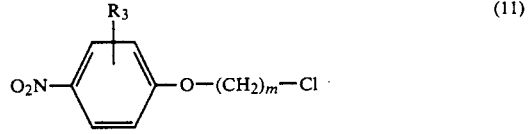 (11)

then reacting the latter with 2-mercaptoethanol to give the thioether compound of the formula

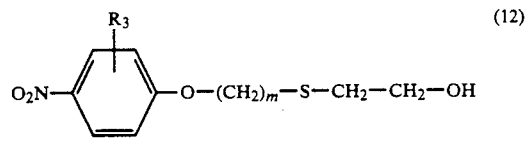 (12)

oxidizing the resulting compound to the sulfonyl compound, reducing the nitro group to the amino group, sulfonating the phenyl radical in a manner known per se, for example by means of oleum, and, if appropriate, introducing a detachable group, for example —OSO$_3$H, —OCOCH$_3$, —SSO$_3$H or —OPO$_3$H$_2$.

The oxidation of the thioether compounds to the sulfones can be effected by various methods, for example by means of hydrogen peroxide with or without the addition of tungsten or vanadium compounds as catalysts, and also by means of peracetic acid, potassium permanganate or chromic acid, or by means of chlorine/hydrochloric acid, in each case in an aqueous, aqueous organic or organic medium.

The reduction of the nitro group to the amino group is effected in a manner known per se by catalytic hydrogenation with Pd/charcoal in ethanol, ethyl acetate or tetrahydrofuran at room temperature or up to about 40° C. The reduction can also be carried out by means of Fe/hydrochloric acid or Fe/acetic acid in aqueous solution.

The compounds of the formula (4) thus obtainable, in which the grouping —$SO_2$—Z is a β-hydroxyethylsulfonyl group, can be converted by treatment with sulfating agents, phosphorylating agents, halogenating agents, alkylsulfonyl or arylsulfonyl halides, alkylcarbonyl or arylcarbonyl halides or alkylcarboxylic or arylcarboxylic anhydrides into the corresponding dye precursors in which the grouping —$SO_2$—Z is, for example, the grouping —$SO_2$—$CH_2$—$CH_2$—O—$SO_3H$, —$SO_2$—$CH_2$—$CH_2$—O—$PO_3H_2$, —$SO_2$—$CH_2$—$CH_2$—halogen, —$SO_2$—$CH_2$—$CH_2$—O—CO—$CH_3$ or —$SO_2$—$CH_2$—$CH_2$—O—CO—$C_6H_5$. The products thus obtained can, in turn, be converted by treatment with agents having an alkaline reaction, for example an alkali metal hydroxide or carbonate, such as sodium hydroxide or sodium carbonate, into corresponding compounds in which the grouping —$SO_2$—Z is the grouping —$SO_2$—$CH_2$=$CH_2$. The products thus obtained can, in turn, be converted by reaction (addition) with salts of thiosulfuric acid, such as sodium thiosulfate, into compounds in which the grouping —$SO_2$—Z is the grouping —$SO_2$—$CH_2$—$CH_2$—S—$SO_3H$.

Examples of suitable sulfating agents in this connection are concentrated sulfuric acid and also chlorosulfonic acid sulfanic acid or other compounds which donate sulfur trioxide. Examples of suitable phosphorylating agents in this connection are concentrated phosphoric acid, pyrophosphoric, metaphosphoric or polyphosphoric acid, alkyl polyphosphates, phosphorus oxychloride or mixtures of phosphoric acid and phosphorus-(V) oxide. Examples of halogenating agents which can be used are thionyl chloride or thionyl bromide.

The compounds of the formula (4) in which X′ is —OH, B is —O— and A′ is a radical of the formula (2b) indicated previously, can be obtained, for example, by reacting a compound of the formula (8) indicated previously first with a compound of the formula

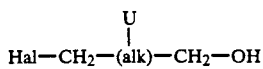

$$\text{Hal—CH}_2\text{—(alk)—CH}_2\text{—OH} \quad (9a)$$
(with U above (alk))

and in other respects following the procedure described previously.

The compounds of the formula (4) in which X′ is —OH, B is —O— and A′ is a radical of the formula (2c) to (2h) indicated previously can be obtained, for example, by reacting a compound of the formula (8) indicated previously with an acid halide of the formula $$\text{Hal—(CH}_2\text{)}_n\text{—CO—Hal} \quad (9b)$$

in which Hal is halogen, especially chlorine, and n is as defined previously, to give the compound of the formula

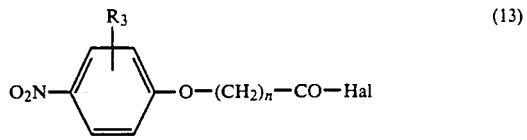

reacting the latter with an amine of the formula

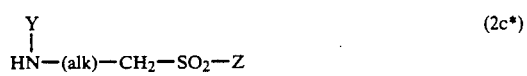

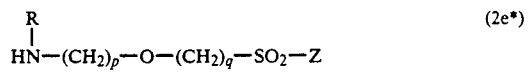

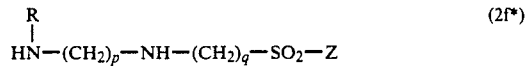

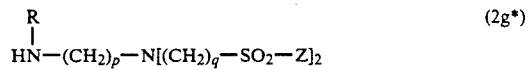

or

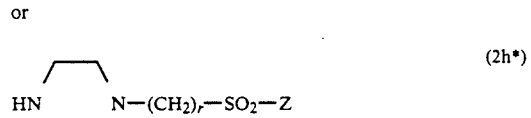

in which V, (alk), Z, R, T, p, q and r are each as defined previously, and then, as described previously, reducing the nitro group to the amino group, sulfonating the phenyl radical and, if appropriate, introducing a detachable group.

One variant of the process described above consists in employing suitable precursors instead of the amines of the formulae (2c*) to (2h*) and converting these precursors subsequently into the corresponding amines.

Examples of suitable precursors are the thioether amines analogous to the formulae (2c*) to (2h*), and these can be oxidized in a known manner to the corresponding sulfones after the reaction with a compound of the formula (13).

It is also possible first to react suitable halogenoalkylamines with the acid chloride of the formula (13) and to react the compounds thus obtained with 2-mercaptoethanol and a sodium alcoholate in alcohol to give the thioether amines mentioned above, which can then, in turn, be oxidized to the sulfones of the formulae (2c*) to (2h*).

It is preferable to employ amines of the formulae (2c*) to (2h*) or precursors thereof containing a preceding stage of the reactive radical and, accordingly, Z is, for example, a radical of the formula HO—$H_2$C—$H_2$C—. The preceding stage of the reactive radical is then introduced into the final stage subsequently as described previously.

The amines of the formulae (2c*) to (2h*) or precursors thereof are, for example, known from EP-A 210,951 or can be prepared analogously thereto.

The reaction (condensation) of the acid chloride of the formula (13) with the abovementioned amines is effected, for example, in an aqueous, aqueous organic or organic medium at a temperature between about 0° and 120° C., preferably 10° to 60° C., in the presence of alkaline, acid-binding agents, for example alkali metal hydroxides, carbonates or bicarbonates.

The compounds of the formula (4) in which X' is —OH and B is a direct bond can be obtained analogously to the corresponding compounds in which B=—O—, if, instead of the compounds of the formula (10) or (13) indicated previously, the compounds, known per se, of the formula

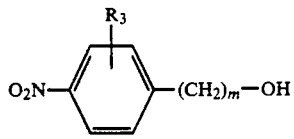
(10')

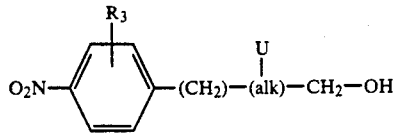
(10'')

or

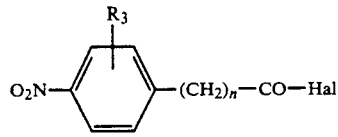
(13')

in which $R_3$, U, Hal, (alk), m and n are each as defined previously, are used as the starting materials.

The compounds of the formula (4) in which X' has the meaning previously indicated for Z, B is the radical —O— and A' is a radical of the formula (3a), (3b) or (3c) indicated previously, can be prepared, for example, by reacting a compound of the formula

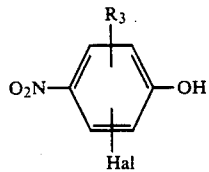
(14)

in which $R_3$ and Hal are each as defined above, first with a halogenoalkyl compound of the formula

 (3a*)

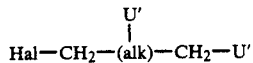 (3b*)

or

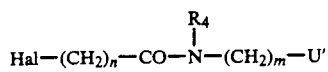 (3c*)

in which Hal, (alk), $R_4$, U', n and m are each as defined previously, and then reacting the product with 2-mercaptoethanol, oxidizing the resulting compound as described previously to give the sulfonyl compound, reducing the nitro group and, if appropriate, introducing one of the detachable groups mentioned previously.

The compounds of the formula (4) in which X' has the meaning indicated previously for Z, B is a direct bond and A' is a radical of the formula (3a), (3b) or (3c) indicated previously can be obtained analogously starting from the compounds, known per se, of the formula

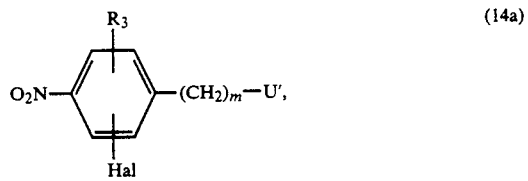
(14a)

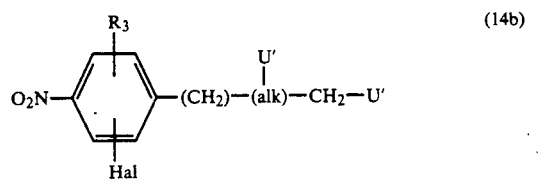
(14b)

or

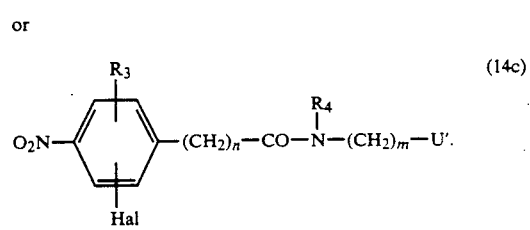
(14c)

The compounds of the formula (5) are known or can be obtained by methods known per se.

The ring-closure of the anil compound of the formula (6) to give the dioxazine compound can be carried out by methods known per se, in particular in concentrated sulfuric acid and, especially, in oleum containing 1-50% by weight of $SO_3$ at temperatures of 10°-80° C., preferably 10° to 50°, if appropriate with the addition of oxidizing agents, such as potassium peroxodisulfate, ammonium peroxodisulfate, manganese dioxide or organic peroxides.

Hydroxyalkyl radicals, for example the β-hydroxyethylsulfonyl radical, present in the starting materials are preferably converted into the corresponding sulfatoalkyl radicals under the reaction conditions used in the ring-closure; in the case of the β-sulfatoethylsulfonyl radical, this can, if appropriate, be converted subsequently, as described previously, into the vinyl form or into another previously mentioned preceding stage of the vinylsulfonyl radical.

The most important process variants are described in the illustrative embodiments.

The dyes, according to the invention, of the formula (1) are fibre-reactive. Fibre-reactive dyes are to be understood as those which are capable of reacting with the hydroxyl groups of cellulose or with the reactive centres of natural or synthetic polyamides with the formation of covalent chemical bonds.

The reactive dyes, according to the invention, of the formula (1) are suitable for dyeing and printing a very wide variety of materials, such as silk, leather, wool, polyamide fibres and, particularly, cellulose-containing fibre materials of all kinds. Examples of these types of fibre materials are the natural cellulose fibres, such as cotton, linen and hemp, and also cellulose and regenerated cellulose. The reactive dyes according to the invention are also suitable for dyeing or printing fibres containing hydroxyl groups, which are present in mixed fabrics, for example mixtures of cotton and polyester fibres or polyamide fibres.

The dyes according to the invention can be applied to the fibre material and fixed on the fibre in various ways, particularly in the form of aqueous dye solutions and printing pastes. They are suitable both for the exhaustion process and for dyeing by the pad-dyeing process, in which the goods are impregnated with aqueous dye solutions, if appropriate containing salts, and the dyes are fixed, if appropriate by the action of heat, after a treatment with alkali or in the presence of alkali. They are particularly suitable for the so-called cold pad-batch process in which the dye is applied on the padder, together with the alkali, and is then fixed by storing for several hours at room temperature. After fixing, the dyeings or prints are thoroughly rinsed with cold and hot water, if appropriate with the addition of an agent which has a dispersing action and promotes the diffusion of the unfixed fractions.

The reactive dyes according to the invention are distinguished by a high reactivity, a good fixing capacity and a good build-up capacity. They can therefore be employed at low dyeing temperatures by the exhaustion dyeing process and, in the pad-steam process, require only short steaming times. The degrees of fixation are high, and the unfixed fractions can be washed out easily, the difference between the degree of exhaustion and the degree of fixation being remarkably small, i.e. the loss through saponification is very low. The reactive dyes according to the invention are also particularly suitable for printing, in particular on cotton, but also for printing nitrogen-containing fibres, for example wool or silk or mixed fabrics containing wool or silk.

The dyeings and prints on cellulose fibre materials produced by means of the dyes according to the invention have a high depth of colour and a high stability of the fibre-dye linkage, both in the acid range and in the alkaline range, and also very good fastness properties to wet processing, such as fasteness to washing, water, sea water, cross-dyeing and perspiration, and also a good fastness to chlorine, pleating, ironing and rubbing. The very good fastness to light of the reactive dyes according to the invention should be singled out particularly.

The following examples serve to illustrate the invention. The temperatures are quoted in degrees Centigrade and parts and percentages are by weight, unless stated otherwise. The ratio between parts by weight and parts by volume is that of kilograms to liters.

EXAMPLE 1

76.2 parts of the amine of the formula

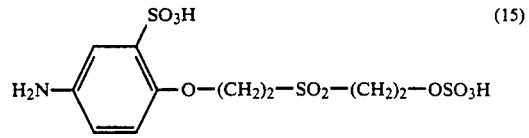

are dissolved in 800 parts of water to form a neutral solution. 24.6 parts of 2,3,5,6-tetrachloroquinone are added, the mixture is heated to approx. 40° C. and the pH is kept, during the subsequent reaction, at 5.5 to 6.0 by the addition of sodium hydroxide solution. Finally, the product is salted out with sodium chloride, filtered off and dried; it has the formula

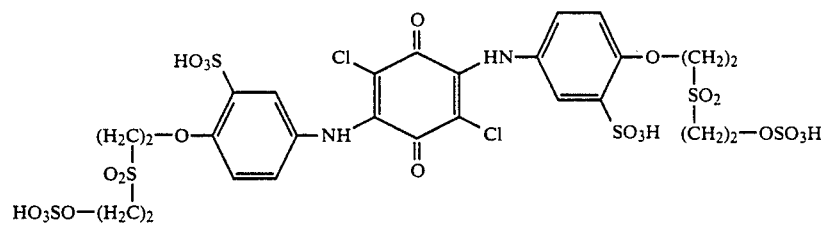

EXAMPLE 2

103 parts of the chloranil condensation product obtained in Example 1 are introduced into 200 parts of 20% oleum at 10° to 20° C. in the course of approx. 1 hour. Stirring is continued until complete solution is reached (approx. 30 to 60 minutes) and 45 parts of potassium peroxodisulfate are then introduced into the viscous mass in the course of approx. 45 minutes at 20° to 25° C., with slight external cooling. After stirring for approx. one further hour, the reaction mixture is poured onto ice and, first 7.5 parts of trisodium phosphate and then sodium hydroxide solution are added to the resulting solution until a pH of 4.5 to 5.0 has been reached. The precipitated dye is filtered off with suction, washed with sodium chloride solution and dried in vacuo; it has the formula

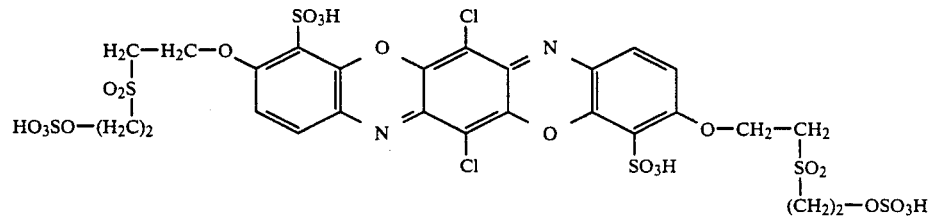

and dyes cotton in deep red shades of excellent overall fastness properties.

EXAMPLE 3 TO 15

The procedure of Examples 1 and 2 is repeated, except that the amines listed in the following table are used instead of the amine of the formula (15), affording analogous dyes:

| Example No. | Amine |
|---|---|
| 3 | H₂N–C₆H₃(SO₃H)–O–(CH₂)₃–SO₂–(CH₂)₂–OSO₃H |
| 4 | H₂N–C₆H₃(SO₃H)–O–CH₂–C(=O)–NH–(CH₂)₂–SO₂–(CH₂)₂–OSO₃H |
| 5 | H₂N–C₆H₃(SO₃H)–O–CH₂–CH(OSO₃H)–CH₂–SO₂–(CH₂)₂–OSO₃H |
| 6 | H₂N–C₆H₃[SO₂–(CH₂)₂–OSO₃H]–O–CH₂–CO–NH–(CH₂)₂–OSO₃H |
| 7 | H₂N–C₆H₃[SO₂–(CH₂)₂–OSO₃H]–O–CH₂–CO–NH–(CH₂)₂–OSO₃H |
| 8 | H₂N–C₆H₃[SO₂–(CH₂)₂–OSO₃H]–O–CH₂–CH(OSO₃H)–CH₂–OSO₃H |
| 9 | H₂N–C₆H₃[SO₂–(CH₂)₂–OSO₃H]–O–(CH₂)₂–OSO₃H |
| 10 | H₂N–C₆H₃(SO₃H)–O–(CH₂)₄–SO₂–(CH₂)₂–OSO₃H |
| 11 | H₂N–C₆H₃(SO₃H)–O–(CH₂)₅–SO₂–(CH₂)₂–OSO₃H |
| 12 | H₂N–C₆H₃(SO₃H)–O–(CH₂)₂–C(=O)–NH–(CH₂)₂–SO₂–(CH₂)₂–OSO₃H |
| 13 | H₂N–C₆H₃(SO₃H)–O–(CH₂)₃–C(=O)–NH–(CH₂)₂–SO₂–(CH₂)₂–OSO₃H |

-continued

| Example No. | Amine |
|---|---|
| 14 | 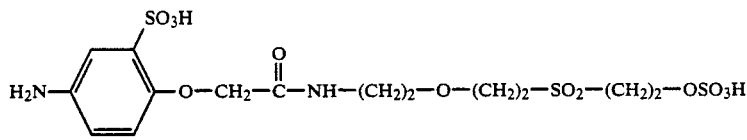 |
| 15 | 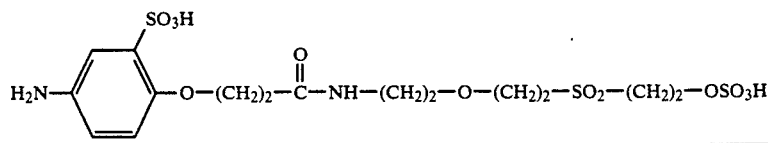 |

Dyeing instructions I 2 parts of the dye obtained in accordance with Example 1 are dissolved in 400 parts of water; 1500 parts of a solution containing 53 g of sodium chloride per liter are added. 100 parts of a cotton fabric are introduced into this dyebath at 40° C. After 45 minutes 100 parts of a solution containing 16 g of sodium hydroxide and 20 g of calcined sodium carbonate per liter are added. The temperature of the dyebath is kept at 40° C. for a further 45 minutes. The dyed goods are then rinsed, soaped at the boil for a quarter of an hour with a nonionic detergent, rinsed again and dried.

Dyeing instructions II 2 parts of the reactive dyestuff obtained in accordance with Example 1 are dissolved in 400 parts of water; 1500 parts of a solution containing 53 g of sodium chloride per liter are added. 100 parts of a cotton fabric are introduced into this dyebath at 35° C. After 20 minutes 100 parts of a solution containing 16 g of sodium hydroxide and 20 g of calcined sodium carbonate per liter are added. The temperature of the dyebath is kept at 35° C. for a further 15 minutes. The temperature is then raised to 60° C. in the course of 20 minutes. The temperature is kept at 60° C. for a further 35 minutes. The goods are then rinsed, soaped at the boil for a quarter of an hour with a nonionic detergent, rinsed again and dried.

Dyeing instructions III 8 parts of the reactive dye obtained in accordance with Example 1 are dissolved in 400 parts of water; 1400 parts of a solution containing 100 g of sodium sulfate per liter are added. 100 parts of a cotton fabric are introduced into this dyebath at 25° C. After 10 minutes 200 parts of a solution containing 150 g of trisodium phosphate per liter are added. The temperature of the dyebath is then increased to 60° C. in the course of 10 minutes. The temperature is kept at 60° C. for a further 90 minutes. The goods are then rinsed, soaped at the boil for a quarter of an hour with a nonionic detergent, rinsed again and dried.

Dyeing instructions IV 4 parts of the reactive dyestuff obtained in accordance with Example 1 are dissolved in 50 parts of water. 50 parts of a solution containing 5 g of sodium hydroxide and 20 g of calcined sodium carbonate per liter are added. The resulting solution is used to pad a cotton fabric so that it takes up about 70% of its weight, and it is then rolled up on a beam. The cotton fabric is stored in this condition for 3 hours at room temperature. The dyed goods are then rinsed, soaped at the boil for a quarter of an hour with a nonionic detergent, rinsed again and dried.

Dyeing instructions V 6 parts of the reactive dye obtained in accordance with Example 1 are dissolved in 50 parts of water. 50 parts of a solution containing 16 g of sodium hydroxide and 0.04 liters of waterglass (38° Bé) per liter are added. The resulting solution is used to pad a cotton fabric so that it takes up 70% of its weight, and it is then rolled up on a beam. The cotton fabric is stored under these conditions for 10 hours at room temperature. The dyed goods are then rinsed, soaped at the boil for a quarter of an hour with a nonionic detergent, rinsed again and dried.

Dyeing instructions VI 2 parts of the reactive dye obtained in accordance with Example 1 are dissolved in 100 parts of water, with the addition of 0.5 part of sodium m-nitrobenzenesulfonate. The resulting solution is used to impregnate a cotton fabric so that it takes up 75% of its weight, and it is then dried. The fabric is then impregnated with a solution at 20° C. containing 4 g of sodium hydroxide and 300 g of sodium chloride per liter, and is squeezed out to a 75% increase in weight, and the dyeing is steamed for 30 seconds at 100° to 102° C., rinsed, soaped for a quarter of an hour in a 0.3% boiling solution of a nonionic detergent, rinsed and dried.

Printing instructions I 3 parts of the reactive dye obtained in accordance with Example I are sprinkled, with rapid stirring, into 100 parts of a stock thickener containing 50 parts of a 5% sodium alginate thickener, 27.8 parts of water, 20 parts of urea, 1 part of sodium m-nitrobenzenesulfonate and 1.2 parts of sodium bicarbonate. The resulting printing paste is used to print a cotton fabric, and the resulting printed material is dried and steamed for 2 minutes at 102° C. in saturated steam. The printed fabric is then rinsed, if appropriate soaped at the boil and rinsed again, and then dried.

Printing instructions II 5 parts of the reactive dye obtained in accordance with Example 1 are sprinkled, with rapid stirring, into 100 parts of a stock thickener containing 50 parts of 5% sodium alginate thickener, 36.5 parts of water, 10 parts of urea, 1 part of sodium m-nitrobenzenesulfonate and 2.5 parts of sodium bicarbonate. The resulting printing paste, the stability of which meets the technical requirements, is used to print a cotton fabric, and the resulting printed material is dried and steamed for 8 minutes at 102° C. in saturated steam. The printed fabric is then rinsed, if appropriate soaped at the boil and rinsed again, and then dried.

What is claimed is:

1. A compound of the formula

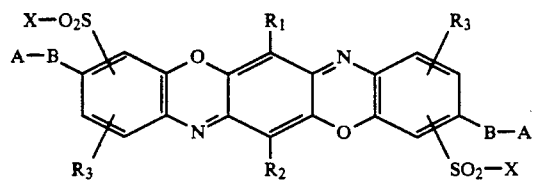 (1)

in which $R_1$ and $R_2$ independently of one another are hydrogen, halogen, $C_1$-$C_4$alkyl, $C_1$-$C_4$alkoxy, phenoxy, carboxyl, carbamoyl or $C_1$-$C_4$alkanoylamino and $R_3$ is hydrogen, sulfo, $C_1$-$C_4$alkyl, $C_1$-$C_4$alkoxy, halogen, carboxyl, carbamoyl, N-$C_1$-$C_4$alkylcarbamoyl, N,N-di-$C_1$-$C_4$alkylcarbamoyl, $C_1$-$C_4$alkylsulfonyl, sulfamoyl, N-$C_1$-$C_4$alkylsulfamoyl or N,N-di-$C_1$-$C_4$alkylsulfamoyl, B is a direct bond or the radical —O—, X is hydroxyl and A is a radical of the formula

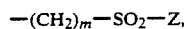 (2a)

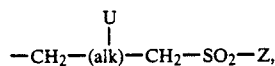 (2b)

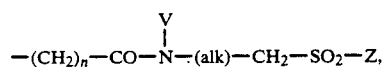 (2c)

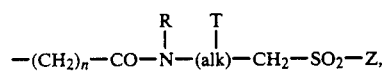 (2d)

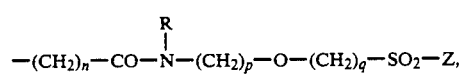 (2e)

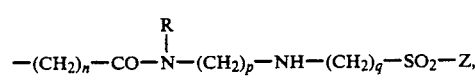 (2f)

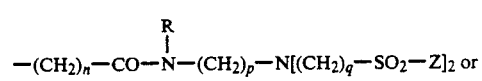 (2g)

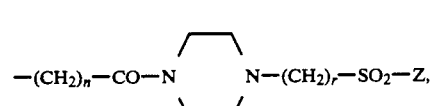 (2h)

in which U is hydroxyl, sulfato, sulfo or halogen, V is hydrogen, substituted or unsubstituted $C_1$-$C_4$alkyl or a radical —(alk)—$CH_2$—$SO_2$—Z, (alk) is a $C_1$-$C_6$alkylene radical, R is hydrogen or $C_1$-$C_6$alkyl, T is hydrogen, halogen, hydroxyl, sulfato, carboxyl, cyano, $C_1$-$C_4$alkanoyloxy, $C_1$-$C_4$alkoxycarbonyl or a radical —$SO_2$—Z, Z is a radical of the formula —CH—$CH_2$ or $CH_2$—$CH_2$—Y, Y is —$OSO_3H$, —S—$SO_3H$, —O-$COCH_3$, —OCO—$C_6H_5$, —$OPO_3H_2$, Cl, Br, F,

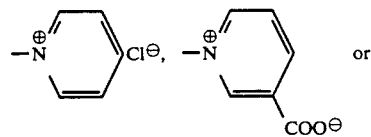
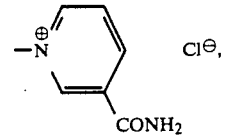

m is an integer from 2 to 6 and n, p, q and r independently of one another are an integer from 1 to 6, or X is as defined above for Z and A is a radical of the formula

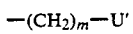 (3a)

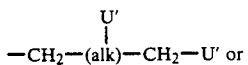 (3b)

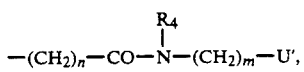 (3c)

in which $R_4$ is hydrogen, $C_1$-$C_4$alkyl or a radical —$(CH_2)_m$—U', U' is hydroxy or sulfato and (alk), n and m are in each case as defined above.

2. A compound according to claim 1, wherein $R_1$ and $R_2$ are each hydrogen, methyl, methoxy, acetylamino or chlorine, especially chlorine, and $R_3$ is hydrogen, chlorine, $C_1$-$C_4$alkyl or $C_1$-$C_4$alkoxy, especially hydrogen.

3. A compound according to claim 1, wherein $R_1$ and $R_2$ are each chlorine, $R_3$ is hydrogen and B is the radical —O—.

4. A compound according to claim 1, wherein X is hydroxyl and A is a radical of the formula (2a) to (2h) indicated in claim 1.

5. A compound according to claim 1, wherein X is hydroxyl and A is a radical of the formula

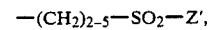 (2a')

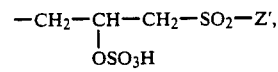 (2b')

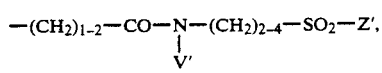 (2c')

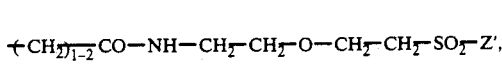 (2e')

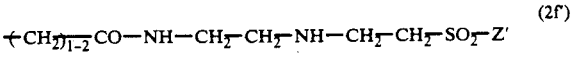 (2f)

or

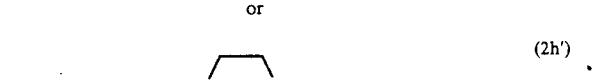 (2h')

in which V' is hydrogen, methyl, ethyl or a radical

Z' is —CH=CH₂ or —CH₂—CH₂—Y' and Y' is —OSO₃H, —SSO₃H, —OCOCH₃, —OPO₃H₂ or —Cl.

6. A compound according to claim 1, wherein X is hydroxyl and A is a radical
—(CH₂)₂—SO₂—(CH₂)₂—OSO₃H
—(CH₂)₃—SO₂—(CH₂)₂—OSO₃H
—(CH₂)₄—SO₂—(CH₂)₂—OSO₃H
—(CH₂)₅—SO₂—(CH₂)₂—OSO₃H
—CH₂—CO—NH—(CH₂)₂—SO₂—(CH₂)₂—OSO₃H
or $$-CH_2-\underset{\underset{OSO_3H}{|}}{CH}-CH_2-SO_2-(CH_2)_2-OSO_3H$$

7. A compound according to claim 1, wherein X is as defined for Z in claim 1 and A is a radical of the formula (3a) to (3c) indicated in claim 1.

8. A compound according to claim 1, wherein X is as defined for Z in claim 1 and A is a radical of the formula $$-(CH_2)_{2-4}-OSO_3H, \quad (3a')$$

$$-CH_2-\underset{\underset{OSO_3H}{|}}{(alk)}-CH_2-OSO_3H \quad (3b')$$

or $$-(CH_2)_{1-2}-CO-\underset{\overset{R_4'}{|}}{N}-(CH_2)_{2-4}-OSO_3H \quad (3c')$$

in which (alk) is methylene or ethylene and R₄' is hydrogen or a radical —(CH₂)₂₋₄—OSO₃H.

9. A compound according to claim 8, wherein A is a radical —CH₂—CH₂—OSO₃H, $$-CH_2-\underset{\underset{OSO_3H}{|}}{CH}-CH_2-OSO_3H$$

—CH₂—CO—NH—CH₂—CH₂—OSO₃H,
—CH₂—CH₂—CO—NH—CH₂—CH₂—OSO₃H or
—CH₂—CO—N (CH₂—CH₂—OSO₃H)₂.

10. A compound of the formula (1) according to claim 1, wherein R₁ and R₂ are each chlorine and R₃ is hydrogen, B is the radical —O—, X is hydroxyl and A is a radical of the formula (2a'), (2b'), (2c'), (2e'), (2f') or (2h') indicated in claim 6, or X is as defined for Z' in claim 6 and A is a radical of the formula (3a'), (3b') or (3c') indicated in claim 9.

11. A compound of the formula (1) according to claim 1, wherein R₁ and R₂ are each chlorine and R₃ is hydrogen, B is the radical —O—, X is hydroxyl and A is a radical
—(CH₂)₂—SO₂—(CH₂)₂—OSO₃H,
—(CH₂)₃—SO₂—(CH₂)₂—OSO₃H,
—(CH₂)₄—SO₂—(CH₂)₂—OSO₃H,
—(CH₂)₅—SO₂—(CH₂)₂—OSO₃H,
—CH₂—CO—NH—(CH₂)₂—SO₂—(CH₂)₂—OSO₃H
or $$-CH_2-\underset{\underset{OSO_3H}{|}}{CH}-CH_2-SO_2-(CH_2)_2-OSO_3H$$

or X is —CH₂—CH₂—OSO₃H and A is a radical
—CH₂—CH₂—OSO₃H, $$-CH_2-\underset{\underset{OSO_3H}{|}}{CH}-CH_2-OSO_3H$$

—CH₂—CO—NH—CH₂—CH₂—OSO₃H,
—CH₂—CH₂—CO—NH—CH₂—CH₂—OSO₃H or
—CH₂—CO—N (CH₂—CH₂—OSO₃H)₂.

* * * * *